(12) United States Patent
Aoki et al.

(10) Patent No.: US 7,374,104 B2
(45) Date of Patent: May 20, 2008

(54) MEMORY CARD

(75) Inventors: Yoshitaka Aoki, Kanagawa (JP); Hideaki Bando, Tokyo (JP); Keiichi Tsutsui, Kanagawa (JP); Hirotaka Nishizawa, Tokyo (JP); Kenji Ohsawa, Tokyo (JP); Takashi Totsuka, Tokyo (JP)

(73) Assignees: Sony Corporation, Tokyo (JP); Renesas Technology Corporation, Tokyo (JP)

( * ) Notice: Subject to any disclaimer, the term of this patent is extended or adjusted under 35 U.S.C. 154(b) by 252 days.

(21) Appl. No.: 11/255,702

(22) Filed: Oct. 21, 2005

(65) Prior Publication Data
US 2006/0097060 A1 May 11, 2006

(30) Foreign Application Priority Data
Oct. 22, 2004 (JP) .............................. 2004-307976

(51) Int. Cl.
*G06K 19/06* (2006.01)
(52) U.S. Cl. .................. 235/492; 257/679; 361/737
(58) Field of Classification Search ................ 235/492; 257/679; 361/737
See application file for complete search history.

(56) References Cited

U.S. PATENT DOCUMENTS 5,481,432 A 1/1996 Tsukada et al.
5,653,596 A 8/1997 Banakis et al.
2003/0090953 A1 5/2003 Kawai et al.

FOREIGN PATENT DOCUMENTS

| EP | 1278154 | 1/2003 |
| JP | 2002-269984 | 9/2002 |
| JP | 2003-178282 | 6/2003 |
| WO | WO 2004/019261 | 3/2004 |

*Primary Examiner*—Michael G. Lee
*Assistant Examiner*—Kristy A. Haupt
(74) *Attorney, Agent, or Firm*—Robert J. Depke; Rockey, Depke & Lyons, LLC.

(57) ABSTRACT

In a memory card with a newly-added module for performing data communication, data communication is stably performed without receiving a noise effect. As an embodiment of the present invention, a memory card 100 has a thin-plate-shaped holding member 20, a memory section 24 provided as buried in the holding member 20, plural first connection pieces 2-10 connected to the memory section 24, a data communication section 26 provided as buried in the holding member 20, and two connection pieces 11, 12 connected to the data communication section 26. The two second connection pieces 11, 12 are disposed at the end of a row part R1 on which only the plural first connection pieces 2-10 are aligned. One first connection piece 10 positioned at the end of the row part R1 is a ground terminal. That is to say, in the plural first connection pieces 2-10, the first connection piece 10 adjacent to the second connection piece 11 is a ground terminal.

19 Claims, 16 Drawing Sheets

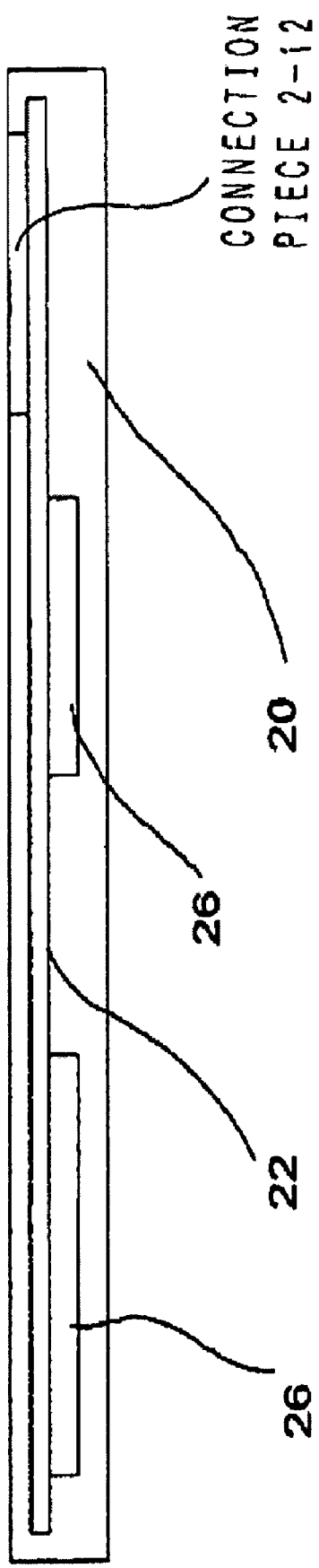
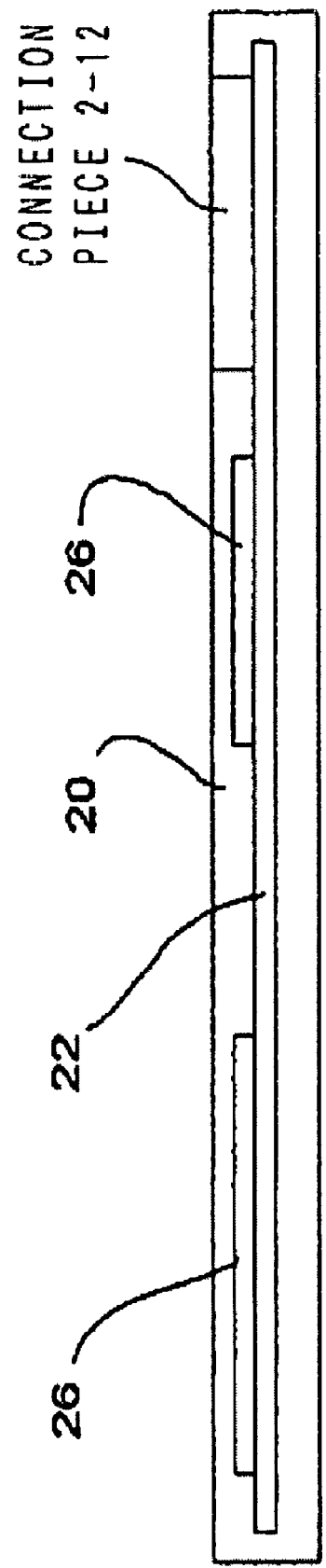
FIG. 3A
FIG. 3B

| CONNECTION PIECE | SIGNAL NAME |
|---|---|
| CONNECTION PIECE 1 | Vss |
| CONNECTION PIECE 2 | BS |
| CONNECTION PIECE 3 | SDIO1 |
| CONNECTION PIECE 4 | SDIO0 |
| CONNECTION PIECE 5 | SDIO2 |
| CONNECTION PIECE 6 | INS |
| CONNECTION PIECE 7 | SDIO3 |
| CONNECTION PIECE 8 | SCLK |
| CONNECTION PIECE 9 | Vcc |
| CONNECTION PIECE 10 | Vss |
| CONNECTION PIECE 11 | D1 |
| CONNECTION PIECE 12 | D2 |

FIG. 4

| CONNECTION PIECE | SIGNAL NAME |
| --- | --- |
| CONNECTION PIECE 1 | Vss |
| CONNECTION PIECE 2 | BS |
| CONNECTION PIECE 3 | SDIO1 |
| CONNECTION PIECE 4 | SDIO0 |
| CONNECTION PIECE 5 | SDIO2 |
| CONNECTION PIECE 6 | INS |
| CONNECTION PIECE 7 | SDIO3 |
| CONNECTION PIECE 8 | SCLK |
| CONNECTION PIECE 9 | Vcc |
| CONNECTION PIECE 10 | Vss |
| CONNECTION PIECE 11 | D1 |
| CONNECTION PIECE 12 | D2 |
| CONNECTION PIECE 13 | D3 |
| CONNECTION PIECE 14 | D4 |

FIG. 13

| CONNECTION PIECE | SIGNAL NAME |
| --- | --- |
| CONNECTION PIECE 1 | Vss |
| CONNECTION PIECE 2 | BS |
| CONNECTION PIECE 3 | SDIO1 |
| CONNECTION PIECE 4 | SDIO0 |
| CONNECTION PIECE 5 | SDIO2 |
| CONNECTION PIECE 6 | INS |
| CONNECTION PIECE 7 | SDIO3 |
| CONNECTION PIECE 8 | SCLK |
| CONNECTION PIECE 9 | Vcc |
| CONNECTION PIECE 10 | Vss |
| CONNECTION PIECE 11 | D+ |
| CONNECTION PIECE 12 | D− |

FIG. 15

MEMORY CARD

The present application claims priority to Japanese Patent Application 2004-307976, filed in the Japanese Patent Office Oct. 22, 2004; the entire contents of which is incorporated herein by reference.

BACKGROUND OF THE INVENTION

1. Field of the Invention

The present invention relates to a memory card.

2. Description of the Related Art

A memory card which has a data rewritable flash memory and in which data is written/read to/from this flash memory has been provided (for example, see Japanese Patent Laid-Open No. 2003-178282).

Such memory card is used to perform data writing and reading by being inserted in the card slot of an external device such as a personal computer and a cellular phone, and it has a single function.

A flash, memory and a control circuit which is connected to this flash memory and performs control of data writing and/or reading are built into such memory card, and plural connection terminals to be connected to the connection terminals of a connector provided in a card slot are provided.

The plural connection terminals of the memory card include a power source terminal for operating the flash memory and the control circuit, a ground terminal, a data communication terminal, a terminal for control signal, or the like.

SUMMARY OF THE INVENTION

To expand other functions than data writing and/or reading to/from such memory card, a multifunctional memory card in which a module for performing data communication, such as a contactless IC function chip for performing data transmission/receiving by radio, and an IC for data communication for performing data transmission/receiving by a USB and a communication interface such as the IEEE 1394 is added are required.

In such multifunctional-type memory card, power supply necessary for operating the contactless IC function chip and the IC for data communication, a ground, connection terminals for supplying various signals, and a conducting pattern for connecting these connection terminals and the contactless IC function chip and data communication IC will be newly added. Therefore, it is apprehended that a noise generated in the flash memory and the control circuit has an effect on data communication in the contactless IC function chip and the data communication IC, or inversely, a noise generated in the contactless IC function chip and the data communication IC has an effect on data communication in the flash memory and the control circuit.

Furthermore, to avoid such effects, it also can be considered that a shield board is provided within a holding member. However, the size of a memory card in length and width is approximately 10 mm, and the width is approximately 0.6 mm to 1.2 mm. Therefore, it is difficult to make such shield board intervene in a point of space.

In view of the foregoing, it is desirable to provide a memory card that is advantageous to stably performing data communication without receiving the effect of the noises, in the memory card in that a module for performing data communication is newly added.

According to an embodiment of the present invention, there is provided a memory card that has a thin-plate-shaped holding member made from isolated material, a memory section for performing data writing and/or reading provided as buried in the above holding member, and plural first connection pieces provided on the surface of the above holding member and connected to the above memory section. In the memory card, the above plural first connection pieces are arranged on the surface of the above holding member, and a row composed of the above plural first connection pieces is formed on the surface of the above holding member. One of the above plural first connection pieces includes a ground terminal for supplying ground potential to the above memory section. A data communication section for performing data transmission and/or receiving other than data in the above memory section is buried in the above holding member. Two second connection pieces connected to the above data-communication section are provided on the surface of the above holding member. The above two second connection pieces are adjacent to each other, and are arranged to form the above row together with the above plural first connection pieces. And the above first connection piece adjacent to the above second connection piece in the above plural first connection pieces is the above ground terminal.

Therefore, two second connection pieces which are connected to a data communication section are adjacent to each other, and they are arranged to form a row together with plural first connection pieces, and in the plural first connection pieces, the first connection piece adjacent to the second connection piece is made of a ground terminal. Thus, both of that a noise generated by a signal transmitted/received via the two second connection pieces enters the plural first connection pieces and has an effect on a signal transmitted/received via a signal terminal in these plural first connection pieces, and that a noise generated by a signal transmitted/received via a signal terminal in the plural first connection pieces enters the two second connection pieces and has an effect on electromagnetic waves transmitted/received via these two second connection pieces can be suppressed as soon as possible. It is advantageous to stably performing both of data communication in the memory section and data communication in the data communication section.

The nature, principle and utility of the present invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3A is a sectional view by A-A in FIG. 2;

FIG. 3B is a sectional view by A-A in FIG. 2;

FIG. 4 is a diagram showing the correspondence between the connection pieces on the memory card 100 and signal names in the first embodiment;

FIG. 13 is a diagram showing the correspondence between the connection pieces on the memory card 100 and signal names in the eighth embodiment;

FIG. 15 is a diagram showing the correspondence between the connection pieces on the memory card 100 and signal names in the ninth embodiment.

DETAILED DESCRIPTION OF THE EMBODIMENT

Preferred embodiments of the present invention will be described with reference to the accompanying drawings:

According to an embodiment of the present invention, two second connection pieces connected to a data communication section is provided on the surface of a holding member, the two second connection pieces are adjacent to each other and are arranged to form a row together with plural first connection pieces, and the first connection piece adjacent to the second connection piece in the plural first connection pieces is made of a ground terminal.

First Embodiment

A first embodiment of the present invention will be described with reference to the accompanying drawings.

Figure 1:
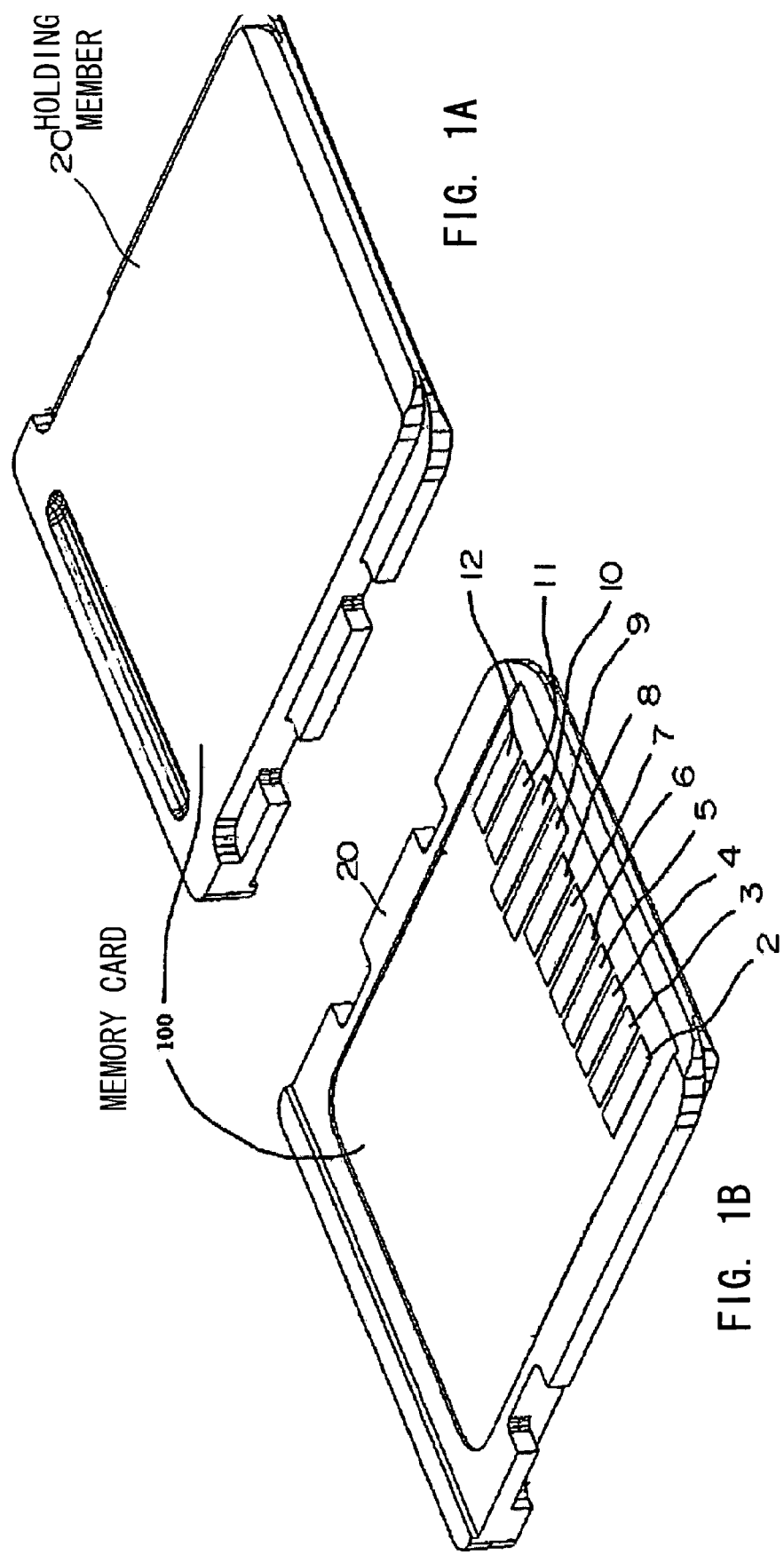
FIG. 1A is a perspective view of a memory card 100.
FIG. 1B is a perspective view of the memory card 100 in a view in the state where it was inverted.
Figure 2:
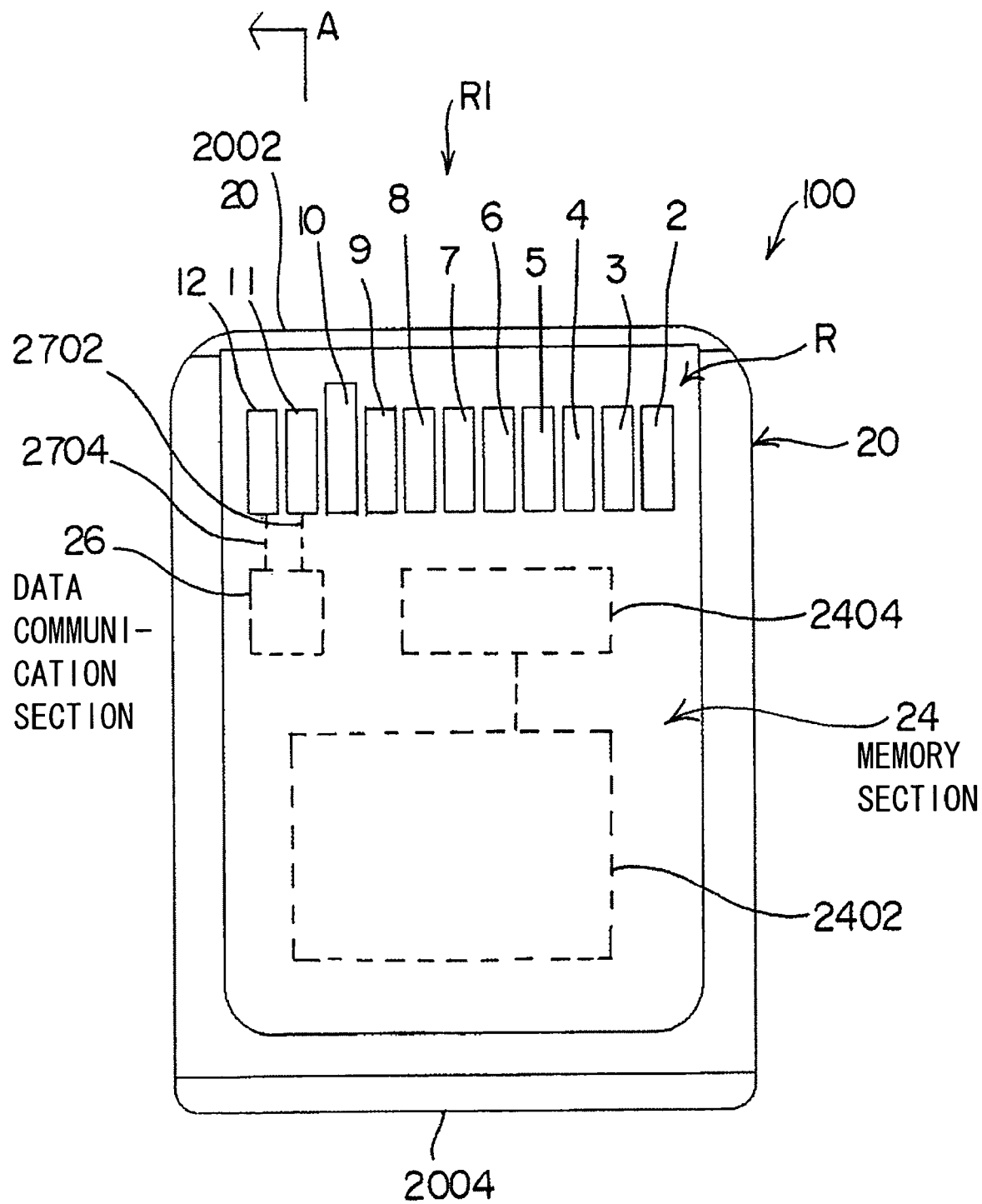
FIG. 2 is a diagram of the reverse side of a memory card 100 in a first embodiment.
Figure 5:
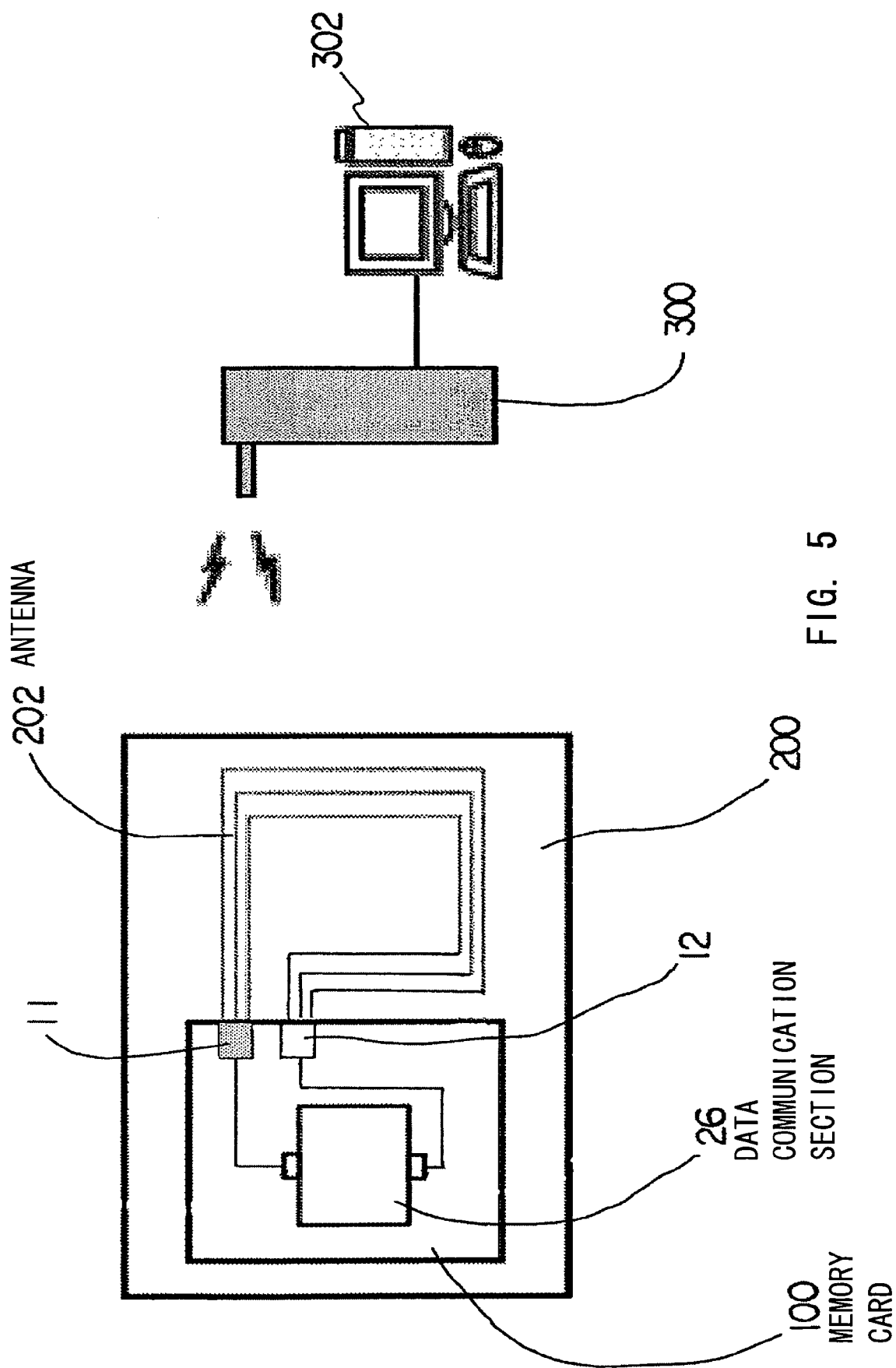
FIG. 5 is a diagram for explaining the operation of the memory card 100.

FIG. 1A is a perspective view of a memory card 100, and FIG. 1B is a perspective view of the memory card 100 in view in the state where it was inverted. FIG. 2 is a diagram of the reverse side of a memory card 100 in a first embodiment. FIGS. 3A and 3B are sectional views by A-A in FIG. 2. FIG. 4 is a diagram showing the correspondence between the connection pieces on the memory card 100 and signal names in the first embodiment. And FIG. 5 is a diagram for explaining the operation of the memory card 100.

As shown in FIG. 1A to FIG. 3, the memory card 100 has a thin-plate-shaped holding member 20, a memory section 24 provided as buried in the holding member 20, plural first connection pieces 2-10 connected to the memory section 24, a data communication section 26 provided as buried in the holding member 20, and two second connection pieces 11, 12 connected to the data communication section 26.

In this embodiment, as shown in FIG. 3A, the memory section 24 and the data communication section 26 are mounted on one side (front surface) in the thickness direction of an isolated board, and on the other side (reverse surface) in the thickness direction of the above isolated board, a printed wiring board 22 on which the plural first connection pieces 2-10 and the two second connection pieces 11, 12 are formed is provided. The memory section 24 and the data communication section 26, and each of the connection pieces 2-12 are arranged in a so-called facing layout. Note that, of course, as shown in FIG. 3B, both of the memory section 24 and the data communication section 26, and each of the connection pieces 2-12 may be arranged on one side of the isolated board in the thickness direction or the other side of it.

The both sides of the printed wiring board 22 in the thickness direction are covered with synthetic resin having an isolation characteristic by a mold. Thereby, the printed wiring board 22 and the synthetic resin are formed in one body, and the thin-plate-shaped holding member 20 is formed. In this embodiment, the size of the holding member 20 is 15 mm in length, 12 mm in width, and 1.0-1.2 mm in thickness. As the synthetic resin having an isolation characteristic to cover the both sides of the printed wiring board 22 in the thickness direction, for example, polycarbonate (PC) and a liquid crystal polymer can be used.

The memory section 24 has a flash memory rewritable data 2402, and a controller 2404 for controlling the input/output operation of data to/from this flash memory 2402. Note that, in FIGS. 2, 3A and 3B, for an easy understanding of the explanation, the flash memory 2402 and the controller 2404 are drawn separately. However, as the configuration of these flash memory 2402 and controller 2404, various configuration already known, such as a layer-built configuration can be adopted.

As shown in FIG. 2, the plural first connection pieces 2-10 are arranged in a line along one side 2002 of the front surface that is one side of the holding member 20 in the thickness direction, and a row R is formed by the plural first connection pieces 2-10 on the front surface of the holding member 20.

Further, the plural first connection pieces 2-10 and the controller 2404 are connected by a conducting pattern formed on the printed wiring board 22. However, to avoid complicatedness of drawings, showing the above conducting pattern in FIG. 2 is omitted.

The plural first connection pieces 2-10 include a signal terminal for transmitting/receiving a signal to/from the memory section 24, a ground terminal for supplying ground potential to the memory section, and a power supply terminal for supplying power to the memory section.

As shown in FIG. 4, the connection pieces 2-8 are the above signal terminals, and the connection piece 9 is the above power supply terminal, and the connection piece 10 is the above ground terminal.

As specifying them in detail, the connection piece 2 is a signal terminal to which a bus-state signal BS showing the separation of data communicated by data signals SDIO0 to SDIO3 is inputted.

The connection piece 3 is a signal terminal for the input/output of the data signal SDIO1, the connection piece 4 is a signal terminal for the input/output of the data signal SDIO0, the connection piece 5 is a signal terminal for the input/output of the data signal SDIO2, and the connection piece 7 is a signal terminal for the input/output of the data signal SDIO3.

The connection piece 6 is an insertion/ejection detection connection piece, and is a signal terminal for transmitting/receiving an INS signal that is used by the above external device for detecting the insertion/ejection of a memory card.

The connection piece 8 is a signal terminal to which a clock signal SCLK is inputted. The above bus-state signal BS and data signals SDIO0-SIDO3 are communicated in synchronization with this clock signal SCLK.

The connection piece 9 is a power supply terminal to which power Vcc is inputted.

The connection piece 10 is a ground terminal which is connected to a ground level (Vss).

The data communication section 26 performs two-way data communication by electromagnetic waves with a reader-writer device via an external antenna that is connected to this data communication section 26 via the two second connection pieces 11, 12, and is a contactless integrated circuit (IC) function chip mounted on a so-called contactless IC card. As the frequency of data communication by the data communication section 26, less than 135 kHz, 13.56 MHz, 2.45 GHz, or the like has been determined by the international standard.

Since the data communication section 26 generates electric power based on received electromagnetic waves and is operated by the electric power, it is unnecessary to receive power supply.

As functions that the data communication section 26 has, for example, an authentication function by holding authentication data for performing authentication and transmitting/receiving this authentication data by data communication, or an electronic settlement function by holding data about electronic money and transmitting/receiving data about this electronic money by data communication can be given.

As shown in FIG. 2, the data communication section 26 and the two second connection pieces 11, 12 are connected by conducting patterns 2702, 2704 formed on an isolated board. As shown in FIG. 4, signals D1, D2 of electromagnetic waves that are transmitted/received to/from the above antenna are inputted/outputted to the second connection pieces 11, 12.

Then, the memory section 24 is provided as buried the outside of the area surrounded by the data communication section 26, the two second connection pieces 11, 12, and the conducting patterns 2702, 2704 in the holding member 20. Therefore, the synthetic resin having an isolation characteristic intervenes between the data communication section 26 and the conducting patterns 2702, 2704, and the memory section 24 and their wiring sections.

The two second connection pieces 11, 12 are adjacent to each other, and they are arranged to form the row R together with the plural first connection pieces 2-10.

In this embodiment, the two second connection pieces 11, 12 are arranged at the end of a row part R1 in that only the plural first connection pieces 2-10 are arranged.

Then, one first connection piece 10 positioned at the end of the row part R1 is made of a ground terminal. That is to say, the first connection piece 10 adjacent to the second connection piece 11 in the plural first connection pieces 2-10 is made of a ground terminal.

Next, the way of using the memory card 100 will be described.

In the case of performing data writing and reading to/from the flash memory 2402 in the memory card 100, the memory card 100 is inserted in a slot for memory card in external equipment such as electronic equipment and a personal computer.

Thereby, a power Vcc and ground potential Vss are supplied to the memory section 24 via the plural first connection pieces 2-10, and also transmitting/receiving of various control signals and data signals is performed with the external equipment. Thus, data writing and reading to/from the flash memory 2402 is performed.

In the case of performing communication to the data communication section 26 of the memory card 100, for example, as shown in FIG. 5, the two connection pieces 11, 12 are connected to the antenna 202 provided on the electronic equipment 200 side by inserting the memory card 100 into the card slot of the electronic equipment 200 such as a cellular phone.

If the memory card 100 and the electronic equipment 200 are made close to a reader-writer device 300 in this state, electromagnetic waves transmitted from the reader-writer device 300 are received by the antenna 202.

The electromagnetic waves received by the antenna 202 are supplied to the data communication section 26 via the two second connection pieces 11, 12. In the data communication section 26, operation is performed by electric power supplied by the electromagnetic waves, and data communication by the electromagnetic waves is performed with the reader-writer device 300 via the antenna 202.

The reader-writer device 300 is connected to a host device 302 such as a personal computer. This host device 302 performs the aforementioned authentication processing or settlement processing of electronic money, based on data communicated via the data communication section 26 of the memory card 100 and the reader-writer device 300.

According to this embodiment, the two second connection pieces 11, 12 which are connected to the data communication section 26 are adjacent to each other, and they are arranged to form the row R together with the plural first connection pieces 2-10, and in the plural first connection pieces 2-10, the first connection piece 10 adjacent to the second connection piece 11 is made of a ground terminal. Therefore, both of that a noise generated by a signal of electromagnetic waves transmitted/received via the two second connection pieces 11, 12 enters the plural first connection pieces 2-10 and has an effect on a signal transmitted/received via a signal terminal in these plural first connection pieces, and that a noise generated by a signal transmitted/received via a signal terminal in the plural first connection pieces and a noise included in power supply voltage supplied to a power supply terminal in the plural connection pieces enter the two second connection pieces 11, 12 and have an effect on electromagnetic waves transmitted/received via these two second connection pieces 11, 12 can be suppressed as soon as possible. It is advantageous to stably performing both of data communication in the memory section 24 and data communication in the data communication section 26.

Then, since the memory section 24 is provided as buried the outside of an area surrounded by the data communication section 26, the two second connection pieces 11, 12, and the conducting patterns 2702, 2704 in the holding member 20, that the noise generated in the memory section 24 enters the conducting patterns 2702, 2704 can be suppressed. It is further advantageous to stably performing both of data communication in the memory section 24 and data communication in the data communication section 26.

More particularly, in a memory card 100 of which the size and thickness are extremely small as this embodiment, it is difficult to provide shield structure for preventing interference by noise in the memory section 24 and the data communication section 26. If providing the shield structure, the memory card becomes the configuration extremely complicated and expensive. Therefore, as described above, according to this embodiment capable of suppressing such interference as soon as possible by the layout of the connection pieces, it is extremely advantageous to contrive to simplify the configuration and to reduce the cost.

Second Embodiment

Next, a second embodiment will be described. Note that, in the description below, the same reference numerals are added to the same part and the same member as in the first embodiment, and their description will be omitted.

Figure 6:
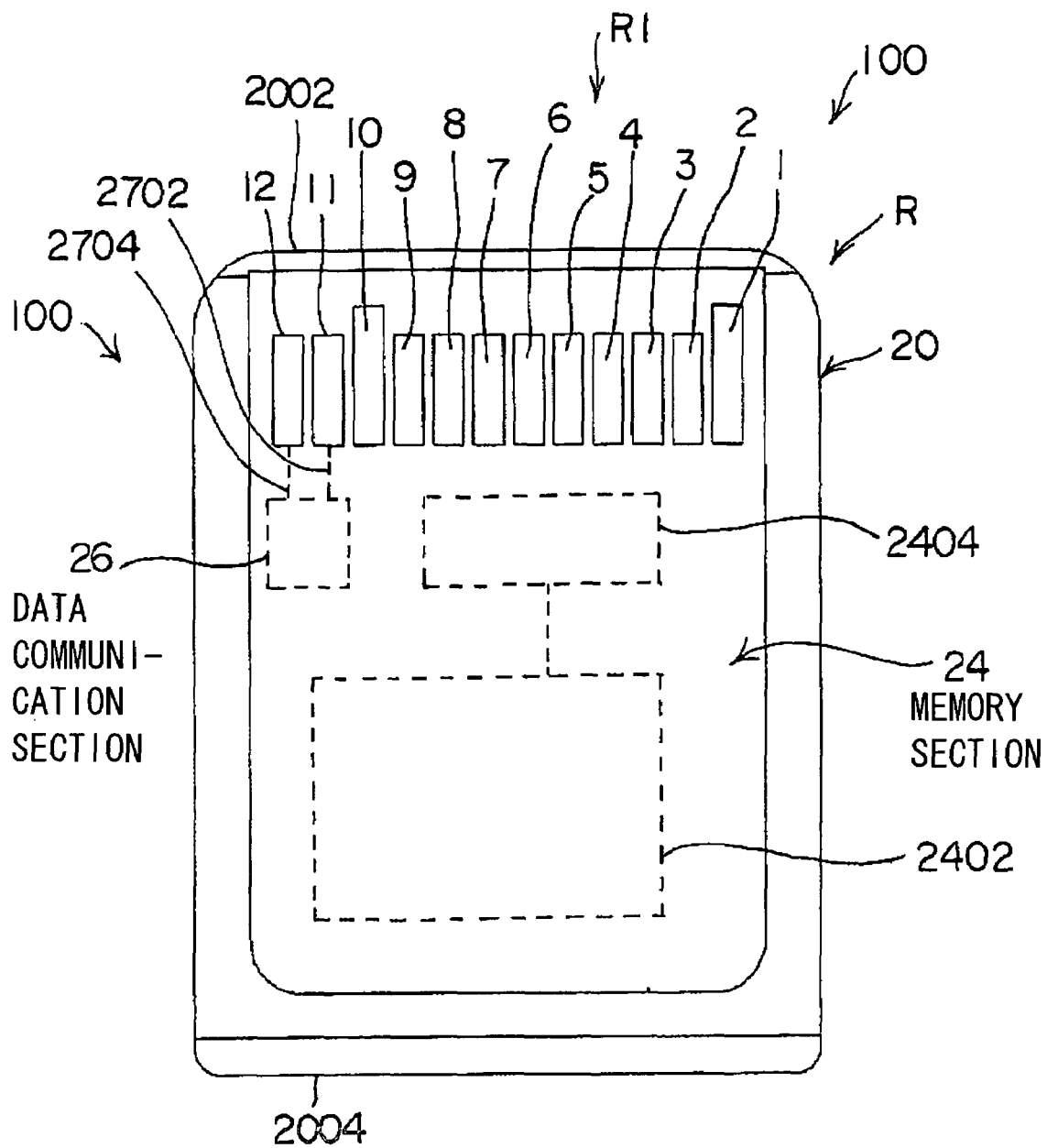
FIG. 6 is a diagram of the reverse side of a memory card 100 in a second embodiment.

FIG. 6 is a diagram of the reverse side of a memory card 100 in the second embodiment.

The second embodiment is an example of modification of the first embodiment. In the first embodiment, the connection piece 10 being one of the plural first connection pieces 2-10 connected to the memory section 24 is a ground terminal. On the other hand, in the second embodiment, two connection pieces 1, 10 in the plural first connection pieces 1-10 are ground terminals.

One of the ground terminals 10 is arranged at one end of a row R1, and the other ground terminal 1 is arranged at the other end of the row R1, similarly to the first embodiment.

The operation and effect are similar to the first embodiment.

Third Embodiment

A third embodiment will be described.

Figure 7:
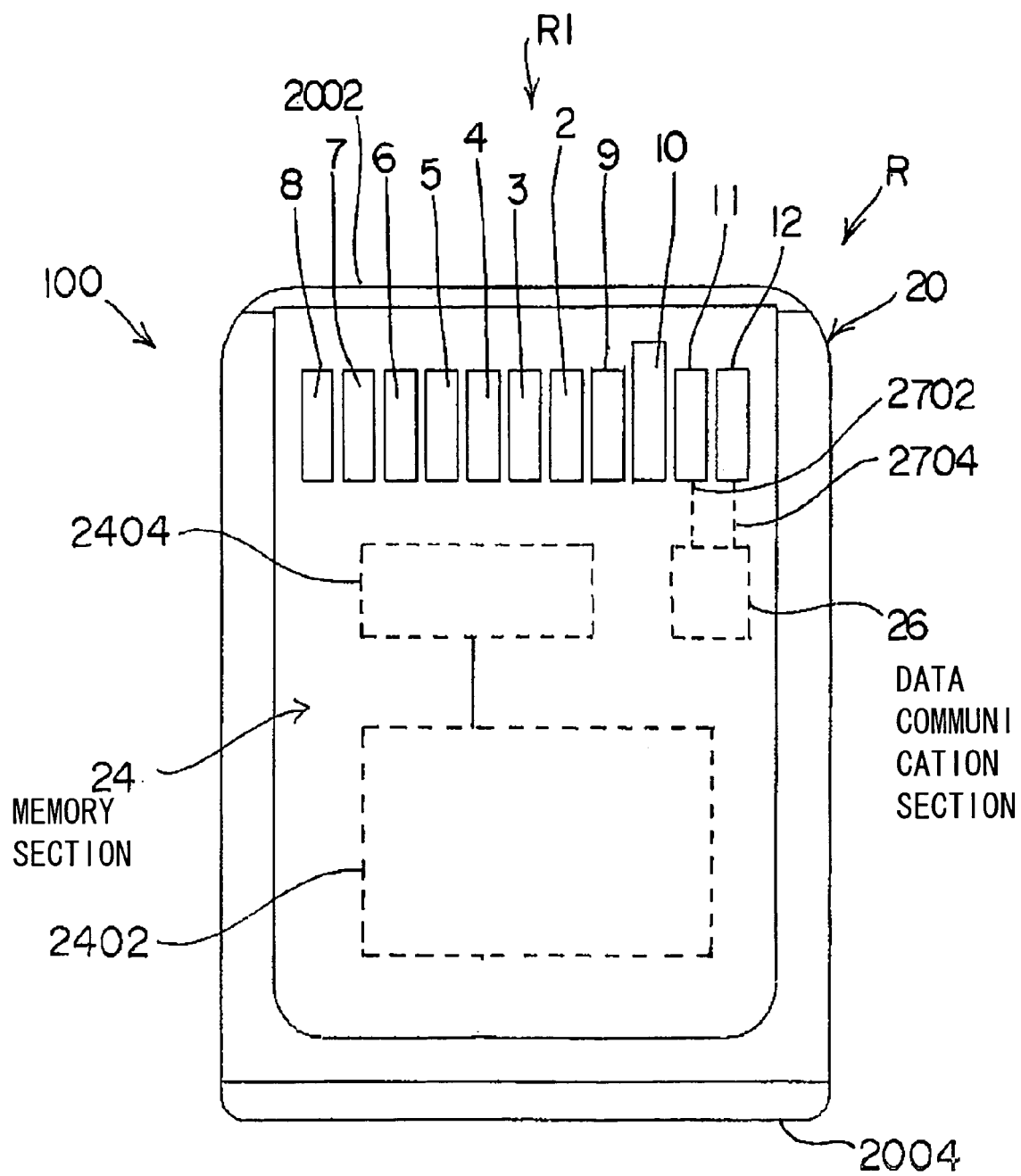
FIG. 7 is a diagram of the reverse side of a memory card 100 in a third embodiment.

FIG. 7 is a diagram of the reverse side of a memory card 100 in the third embodiment.

The third embodiment is an example of modification of the first embodiment. In the first embodiment, the two second connection pieces 11, 12 are arranged at the left end of the row R1 when it is viewed as a plane. On the other hand, in the third embodiment, two second connection pieces 11, 12 are arranged at the right end of the row R1 when it is viewed as a plane.

The operation and effect are similar to the first embodiment.

Fourth Embodiment

A fourth embodiment will be described.

Figure 8:
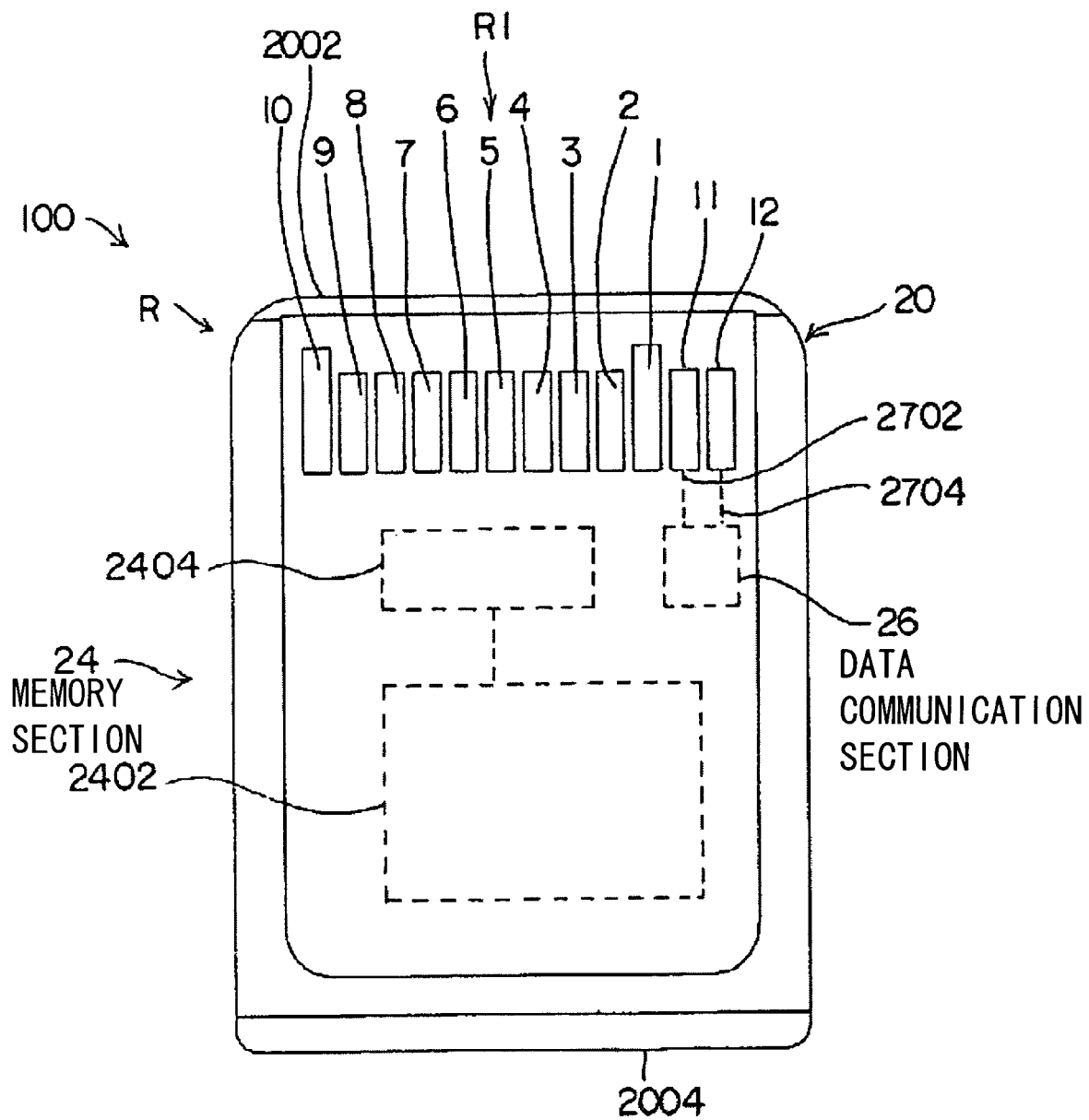
FIG. 8 is a diagram of the reverse side of a memory card 100 in a fourth embodiment.

FIG. 8 is a diagram of the reverse side of a memory card 100 in the fourth embodiment.

The fourth embodiment is an example of modification of the second embodiment. In the second embodiment, the two second connection pieces 11, 12 are arranged at the left end of the row R1 when it is viewed as a plane. On the other hand, in the fourth embodiment, two second connection pieces 11, 12 are arranged at the right end of the row R1 when it is viewed as a plane.

The operation and effect are similar to the first embodiment.

Fifth Embodiment

A fifth embodiment will be described.

Figure 9:
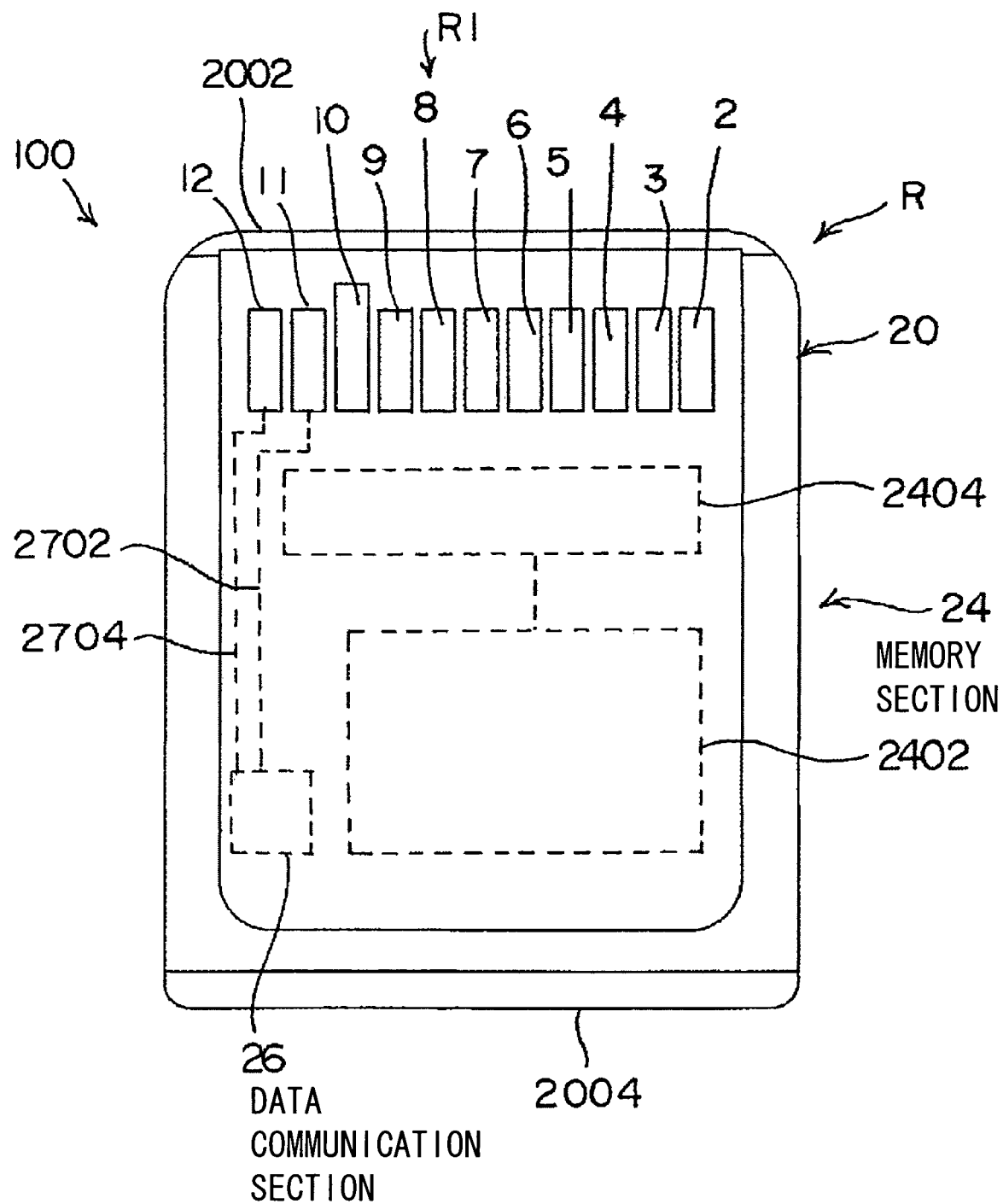
FIG. 9 is a diagram of the reverse side of a memory card 100 in a fifth embodiment.

FIG. 9 is a diagram of the reverse side of a memory card 100 in the fifth embodiment.

The fifth embodiment is an example of modification of the first embodiment. In the first embodiment, the data communication section is disposed at a part close to the two second connection pieces 11, 12 in a holding member 20. On the other hand, in the fifth embodiment, a controller 2404 is disposed at a part close to two second connection pieces 11, 12 in the holding member 20. To avoid interference with this controller 2404, a data communication section 26 is disposed at a part on a side 2004 facing to a side 2002 in that a row R is provided. A conducting pattern that connects the two second connection pieces and the data communication section is longer than the first embodiment. According to an embodiment of the present invention, the layout of the data communication section 26, the controller 2404 and the flash memory 2402 is arbitrary.

The operation and effect are similar to the first embodiment.

Sixth Embodiment

A sixth embodiment will be described.

Figure 10:
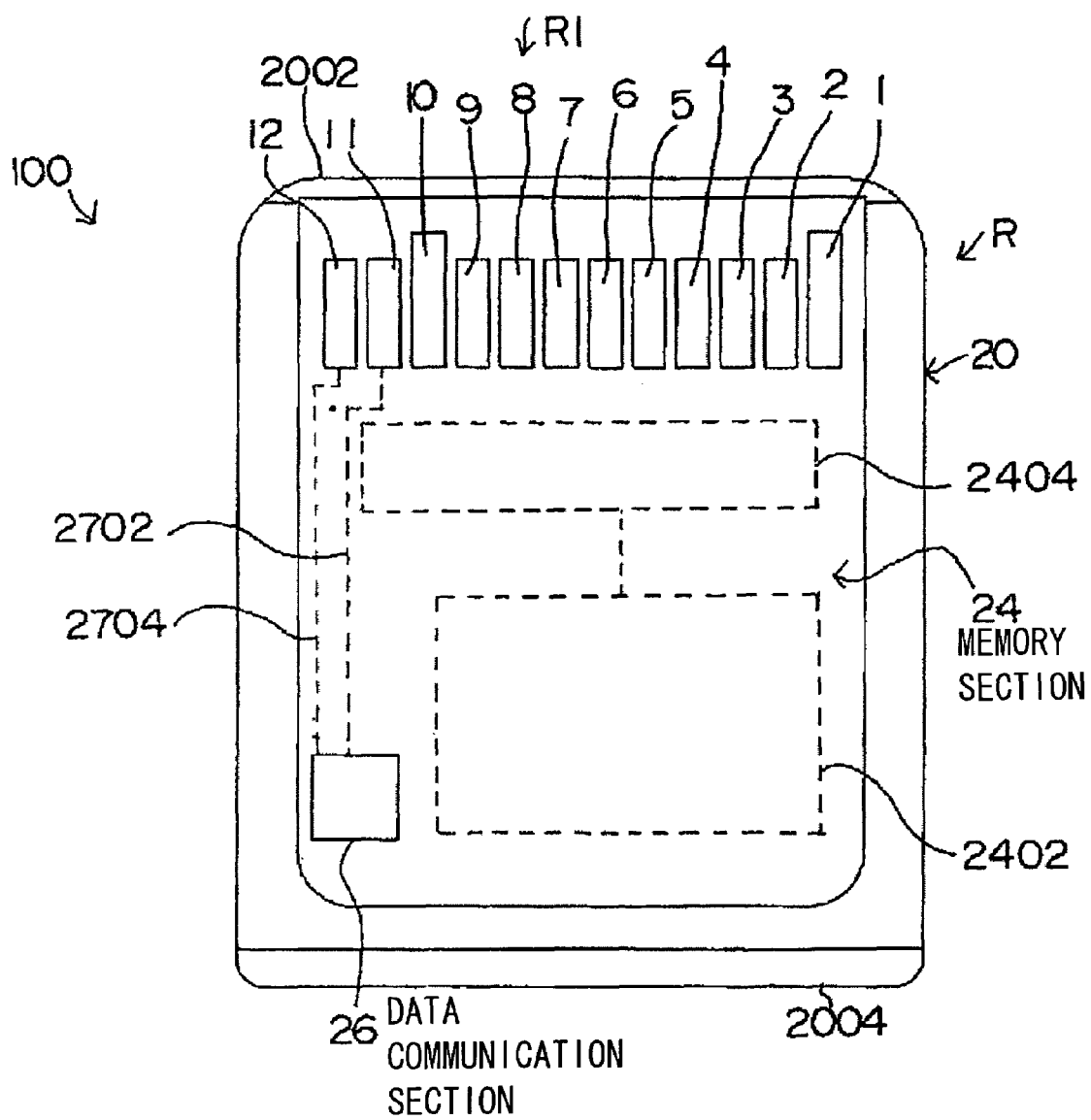
FIG. 10 is a diagram of the reverse side of a memory card 100 in a sixth embodiment.

FIG. 10 is a diagram of the reverse side of a memory card 100 in the sixth embodiment.

The sixth embodiment is an example of modification of the second embodiment. In the second embodiment, the data communication section is disposed at a part close to the two second connection pieces 11, 12 in the holding member 20. On the other hand, in the sixth embodiment, a controller 2404 is disposed at a part close to two second connection pieces 11, 12 in a holding member 20. To avoid interference with this controller 2404, a data communication section 26 is disposed at a part on a side 2004 facing to a side 2002 in that a row R is provided. Conducting patterns 2702, 2704 which connect the two second connection pieces 11, 12 and the data communication section 26 are longer than the second embodiment.

The operation and effect are similar to the first embodiment.

Seventh Embodiment

A seventh embodiment will be described.

Figure 11:
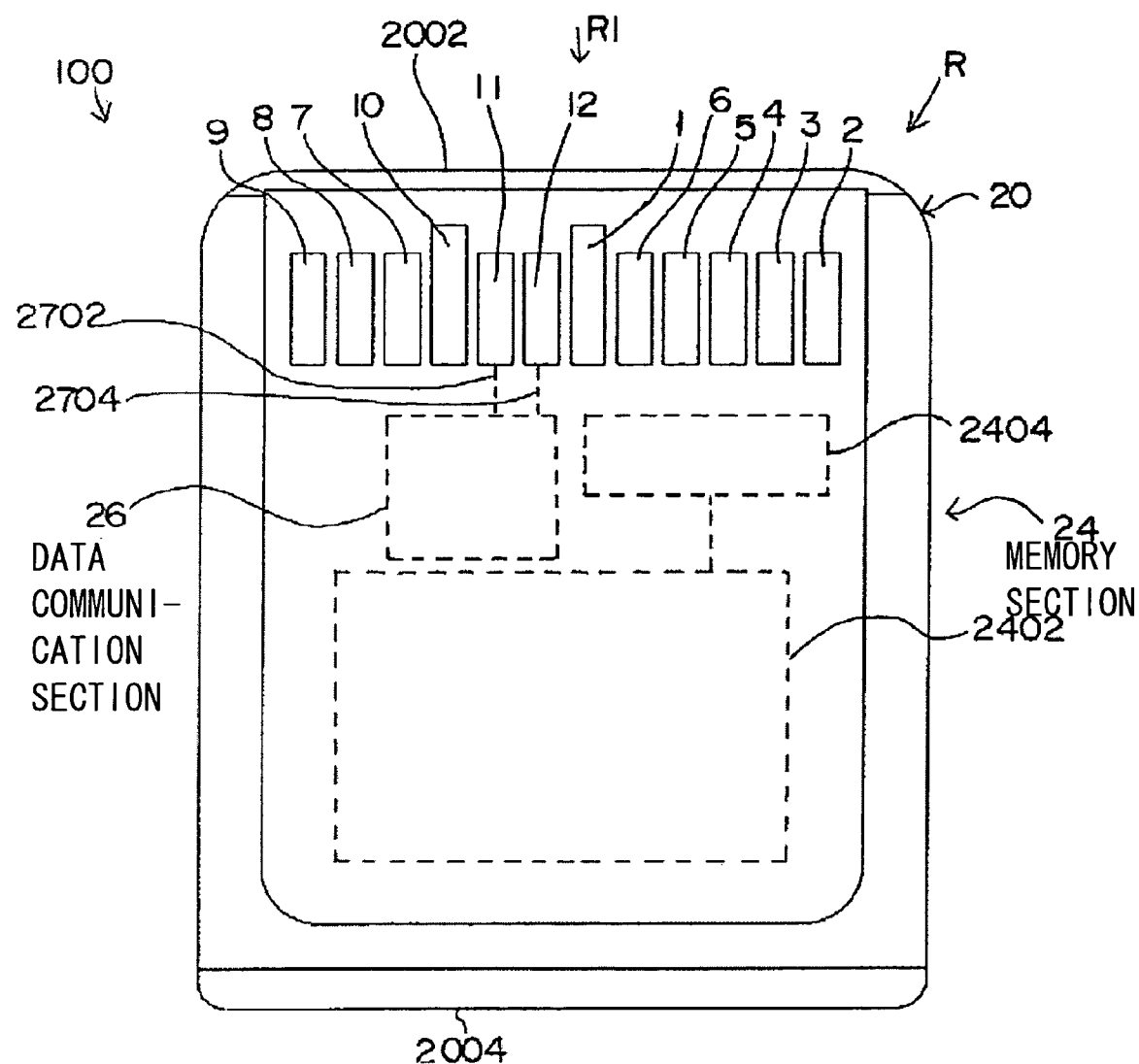
FIG. 11 is a diagram of the reverse side of a memory card 100 in a seventh embodiment.

FIG. 11 is a diagram of the reverse side of a memory card 100 in the seventh embodiment.

The seventh embodiment is an example of modification of the first embodiment. In the first embodiment, the two second connection pieces 11, 12 are arranged at the end of the row R1. On the other hand, in the seventh embodiment, two second connection pieces 11, 12 are arranged at a part between plural first connection pieces forming a row R.

In the seventh embodiment, similarly to the second embodiment, two connection pieces 1, 10 in plural first connection pieces 1-10 are ground terminals, and first connection pieces 1, 10 respectively positioned on the both sides of the two second connection pieces 11, 12 are ground terminals respectively.

Also in such seventh embodiment, since a ground terminal is respectively positioned on the both sides of the two second connection pieces 11, 12, operation and an effect similarly to the first embodiment can be obtained.

Eighth Embodiment

An eighth embodiment will be described.

Figure 12:
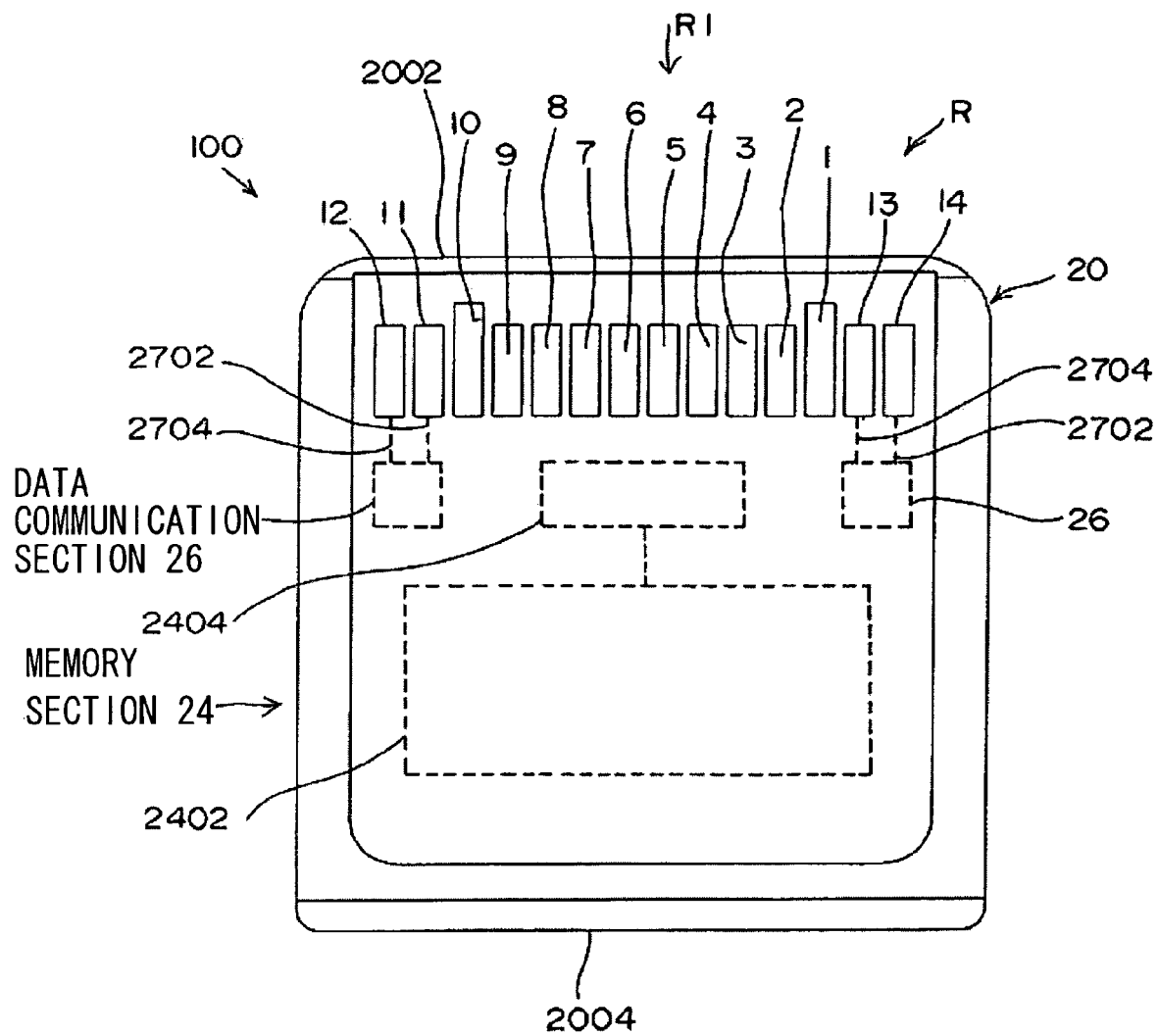
FIG. 12 is a diagram of the reverse side of a memory card 100 in an eighth embodiment.

FIG. 12 is a diagram of the reverse side of a memory card 100 in an eighth embodiment. And FIG. 13 is a diagram showing the correspondence between the connection pieces on the memory card 100 and signal names in the eighth embodiment.

The eighth embodiment is an example of modification of the first embodiment. In the first embodiment, the one data communication section 26 is provided, and the two second connection pieces 11, 12 connected to this data communication section 26 are arranged at the end of the row R1. On the contrary, in the eighth embodiment, two data communication sections 26, 26 are provided, and two second connection pieces 11, 12, 13, 14 respectively connected to these data communication sections 26, 26 are arranged at the both ends of a row R1.

In the eighth embodiment, similarly to the second embodiment, two connection pieces 1, 10 in plural first connection pieces 1-10 are ground terminals, and first connection pieces 1, 10 facing to the two second connection pieces 11, 13 are ground terminals respectively.

As describing these connection pieces, the plural first connection pieces 1-10 include, similarly to the first embodiment, a signal terminal for transmitting/receiving a signal to/from a memory section 24, a ground terminal for supplying ground potential to the memory section 24, and a power supply terminal for supplying power to the memory section 24.

As shown in FIG. 13, the connection pieces 2-8 are the above signal terminals, the connection piece 9 is the above power supply terminal, and the connection piece 10 is the above ground terminal.

As describing them in detail, the connection piece 2 is a signal terminal to which a bus-state signal BS showing the separation of data communicated as data signals SDIO0-SDIO3 is inputted.

The connection piece 3 is a signal terminal for the input/output of the data signal SDIO1, the connection piece 4 is a signal terminal for the input/output of the data signal SDIO0, the connection piece 5 is a signal terminal for the input/output of the data signal SDIO2, and the connection piece 7 is a signal terminal for the input/output of the data signal SDIO3.

The connection piece 6 is a connection piece for detecting insertion/ejection, and is a signal terminal for transmitting/receiving an INS signal that will be used by the above external device to detect insertion/ejection of a memory card.

The connection piece 8 is a signal terminal to which a clock signal SCLK is inputted. The above bus-state signal BS and data signals SDIO-SDIO3 are communicated in synchronization with this clock signal SCLK.

The connection piece 9 is a power supply terminal to which power Vcc is inputted.

The connection piece 10 is a ground terminal that is connected to a ground level (Vss).

One of the two second connection pieces 11, 12 is connected to one data communication section 26 by conducting patterns 2702, 2704 formed on an isolated board. Signals D1, D2 of electromagnetic waves transmitted/received with an antenna are inputted/outputted to/from the second connection pieces 11, 12.

The other two second connection pieces 13, 14 are connected to the other data communication section 26 by conducting patterns 2702, 2704 formed on the isolated board. Signals D3, D4 of electromagnetic waves transmitted/received with an antenna other than the above antenna are inputted/outputted to/from the second connection pieces 13, 14.

Also in such eighth embodiment, ground terminals are respectively positioned at parts facing to the two second connection pieces. Thus, it is advantageous to that the two data communication sections 26 stably perform data communication, in addition to the operation and effect similar to the first embodiment.

Ninth Embodiment

A ninth embodiment will be described.

Figure 14:
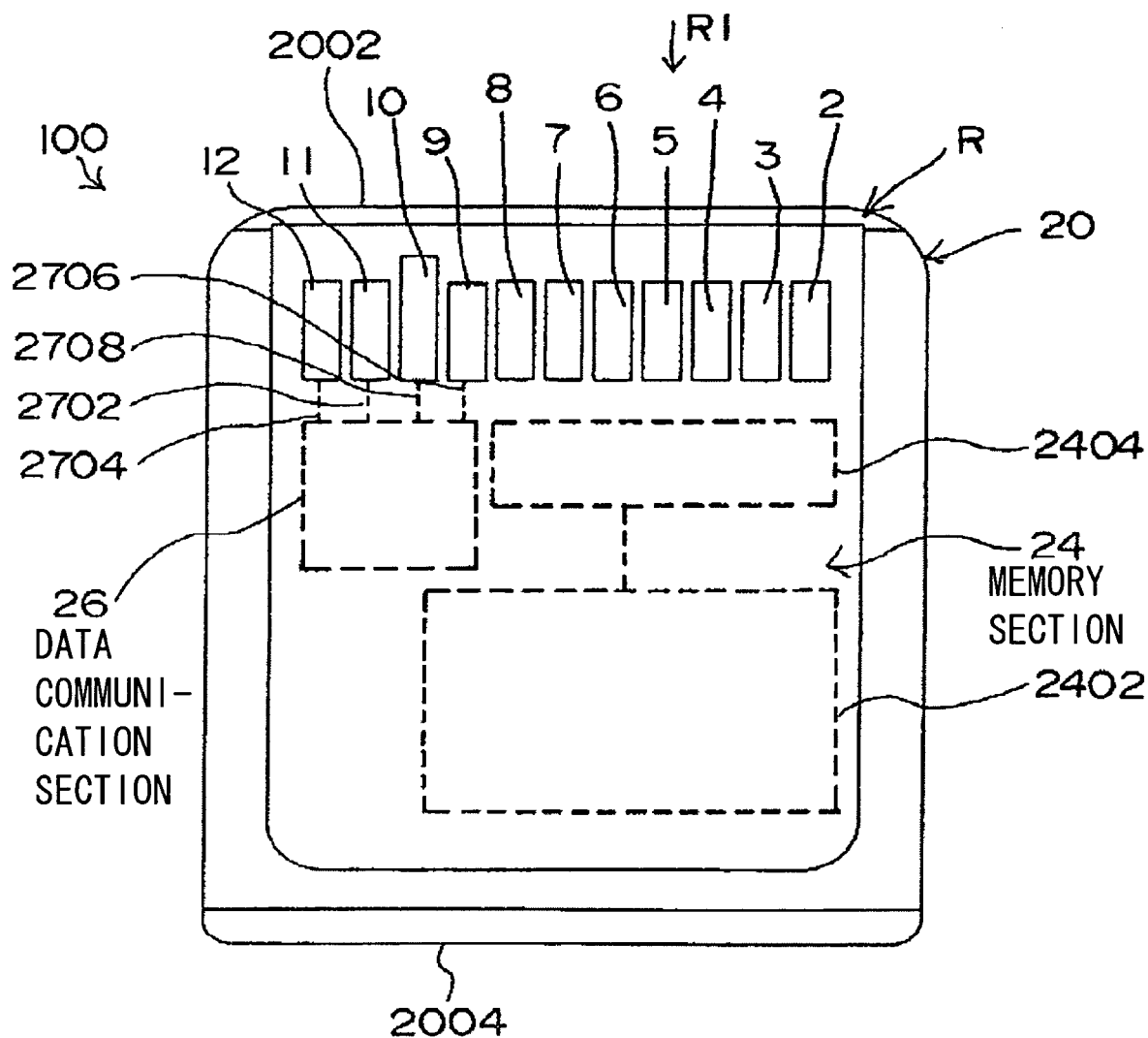
FIG. 14 is a diagram of the reverse side of a memory card 100 in a ninth embodiment.

FIG. 14 is a diagram of the reverse side of a memory card 100 in a ninth embodiment. And FIG. 15 is a diagram showing the correspondence between connection pieces on the memory card 100 and signal names in the ninth embodiment.

The ninth embodiment is an example of modification of the first embodiment. In the first embodiment, the two second connection pieces 11, 12 are connected to the data communication section 26. On the other hand, in the ninth embodiment, a power supply terminal (connection piece 9) and a ground terminal (connection piece 10) are connected in addition to two second connection pieces 11, 12.

In the ninth embodiment, the power supply terminal (connection piece 9) is disposed at a part on the opposite side of the second connection pieces 11, 12 as sandwiching the ground terminal (connection piece 10).

The power supply terminal (connection piece 9) and the ground terminal (connection piece 10) are respectively connected to a data communication section 26 via conducting patterns 2706, 2708. Furthermore, these power supply terminal (connection piece 9) and ground terminal (connection piece 10) are connected to a controller 2404 via a conducting pattern not shown. The power supply terminal (connection piece 9) and the ground terminal (connection piece 10) are used in common by both of the data communication section 26 and the memory section 24.

As such data communication section 26, there is a device in that digital data is transmitted/received by a USB and a communication interface such as the IEEE 1394 by differential between data on the plus side and data on the minus side.

Note that, in FIG. 14, a transmission line which has a characteristic impedance between both or one of the two second connection pieces 11, 12 connected to the data communication section 26 and the ground terminal (connection piece 10) is formed. Thereby, impedance between the transmission line and an external device that transmits data via this transmission line can be matched.

According to such configuration, it can cope with the capacity and inductance in each connection piece of the two second connection pieces 11, 12 and the ground terminal (connection piece 10). Furthermore, it can cope with the mode conversion of a transmission signal (conversion from coplanar line, twist pair, and coaxial transmission line) with the connector of the above external device connected to these two second connection pieces 11, 12, and the ground terminal (connection piece 10).

In the ninth embodiment, similarly to the second embodiment, one connection piece 10 in plural first connection pieces 1-10 is a ground terminal, and the first connection piece 10 facing to the two second connection pieces 11, 12 is a ground terminal.

As describing these connection pieces, similarly to the first embodiment, the plural first connection pieces 2-10 include a signal terminal for transmitting/receiving a signal to/from a memory section 24, a ground terminal for supplying ground potential to the memory section 24, and a power supply terminal for supplying power to the memory section 24.

As shown in FIG. 15, the connection pieces 2-8 are the above signal terminals, the connection piece 9 is the above power supply terminal, and the connection piece 10 is the above ground terminal.

As describing them in detail, the connection piece 2 is a signal terminal to which a bus-state signal BS showing the separation of data communicated as data signals SDIO0-SDIO3 is inputted.

The connection piece 3 is a signal terminal for the input/output of the data signal SDIO1, the connection piece 4 is a signal terminal for the input/output of the data signal SDIO0, the connection piece 5 is a signal terminal for the input/output of the data signal SDIO2, and the connection piece 7 is a signal terminal for the input/output of the data signal SDIO3.

The connection piece 6 is a connection piece for detecting insertion/ejection, and is a signal terminal for transmitting/ receiving an INS signal that will be used by the above external device to detect insertion/ejection of a memory card.

The connection piece 8 is a signal terminal to which a clock signal SCLK is inputted. The above bus-state signal BS and data signals SDIO0-SDIO3 are communicated in synchronization with this clock signal SCLK.

The connection piece 9 is a power supply terminal to which power Vcc is inputted.

The connection piece 10 is a ground terminal that is connected to a ground level (Vss).

The two second connection pieces 11, 12 are connected to the data communication section 26 by conducting patterns 2702, 2704 formed on an isolated board. Digital signals in differential form that are transmitted/received to/from an external device, that is, data signal on the plus side +D and data signal on the minus side −D are inputted/outputted to/from the second connection pieces 11, 12.

Also in such ninth embodiment, since a ground terminal is positioned at a part facing to the second connection piece 11, the operation and effect similar to the first embodiment 1 can be obtained.

Tenth Embodiment

A tenth embodiment will be described.

Figure 16:
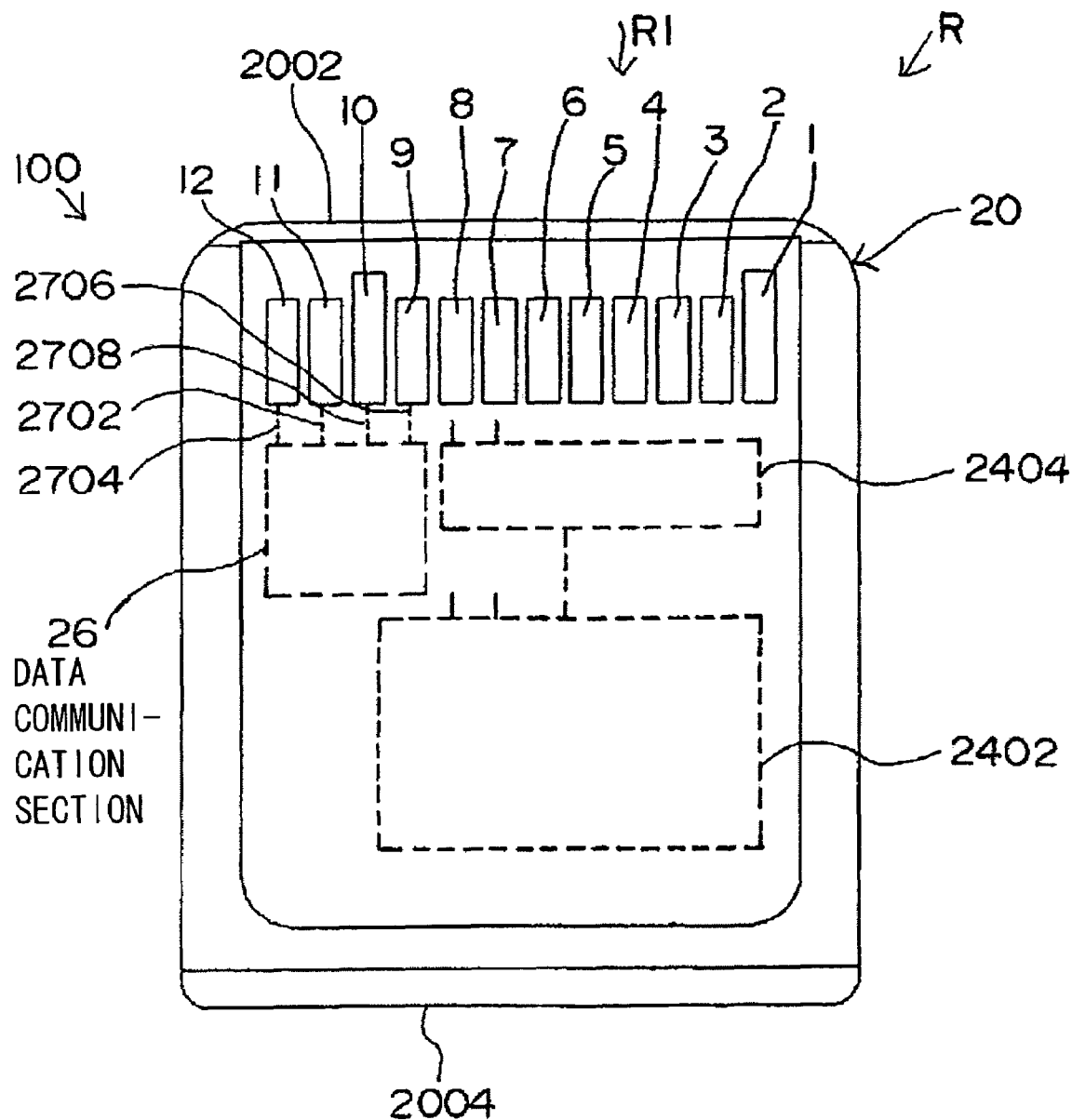
FIG. 16 is a diagram of the reverse side of a memory card 100 in a tenth embodiment.

FIG. 16 is a diagram of the reverse side of a memory card 100 in the tenth embodiment.

The tenth embodiment is an example of modification of the ninth embodiment. In the ninth embodiment, the connection piece 10 being one of the plural first connection pieces 2-10 connected to the memory section 24 is a ground terminal. On the other hand, in the tenth embodiment, two connection pieces 1, 10 in plural first connection pieces 1-10 are ground terminals.

One ground terminal is arranged at one end of a row R1, and the other ground terminal is arranged at the other end of the row R1, similarly to the ninth embodiment.

The operation and effect are similar to the ninth embodiment.

Note that, in the aforementioned embodiments, it has dealt with the case where the holding member 20 is formed by that both sides of the printed wiring board 22 are covered with synthetic resin by using a mold. However, the holding member 20 may be formed by sandwiching the printed wiring board 22 by thin front and reverse cases.

Furthermore, in the aforementioned embodiments, it has dealt with the case where the plural connection pieces 1-12 are formed to be exposed on the front surface of the holding member 20. However, it is arbitrary such that a notch is provided on one side of the front surface of the holding member 20 and plural connection pieces 1-12 are exposed by this notch.

While there has been described in connection with the preferred embodiments of the present invention, it will be obvious to those skilled in the art that various changes, modifications, combinations, sub-combinations and alternations may be aimed, therefore, to cover in the appended claims all such changes and modifications as fall within the scope of the present invention.

What is claimed is:

1. A memory card comprising:
    a thin-plate-shaped holding member made from insulating material;
    a memory section for performing data writing and/or reading provided in said holding member;
    plural first connection pieces provided on a surface of said holding member and electrically connected to said memory section, such that at least one of said plural first connection pieces is a ground terminal for supplying a ground potential to said memory section;
    a data communication section for performing data transmission and/or reception, separate from data being delivered to and/or from said memory section via said plurality of first connection pieces, is provided in said holding member; and
    two second connection pieces electrically connected to said data communication section are provided on the surface of said holding member;
    wherein;
    said plural first connection pieces are arranged on the surface of said holding member in a row,
    said two second connection pieces are immediately adjacent to each other, and are arranged in said row together with said plural first connection pieces, and
    a closest first connection piece adjacent to said second connection pieces in said row is said ground terminal.

2. The memory card according to claim 1, wherein said row has a first contiguous row portion in which only plural first connection pieces are arranged, and said two second connection pieces are disposed at an end of said first row portion.

3. The memory card according to claim 2, wherein said first connection piece positioned at the end of said first contiguous row portion closest to said two second connection pieces is said ground terminal.

4. The memory card according to claim 1, wherein two of said plural first connection pieces include a ground terminal for supplying ground potential to said memory section, said row has a first contiguous row portion in which only plural first connection pieces are arranged, said two second connection pieces are disposed at an end of said first row part portion, and said two first connection pieces positioned at opposing ends of said first row portion are said around terminals.

5. The memory card according to claim 4, wherein said row is provided at one end of the memory card, and said data communication section is provided at an opposite end of the memory card.

6. The memory card according to claim 4, further comprising a second data communication section provided in said holding member and third and fourth second connection pieces provided on a surface of said holding member for connecting to said second data communication section, wherein said third and fourth second connection pieces are provided on an opposite side of said first row portion from said first two second connection pieces, such that said first two second connection pieces are disposed immediately adjacent a ground terminal of said first connection pieces, and said third and fourth second connection pieces are provided immediately adjacent a ground terminal of said first connection pieces.

7. The memory card according to claim 1, wherein said data communication section and said two second connection pieces are connected by leads provided within said holding member, and said memory section is provided in said holding member outside an area bordered by said data communication section, said two second connection pieces, and said leads.

8. The memory card according to claim 1, wherein of said plural first connection pieces includes a power supply terminal for supplying power to said memory section, and said ground terminal and said power supply terminal are also connected to said data communication section.

9. The memory card according to claim 8, wherein two of said plural first connection pieces are ground terminals, and both of said ground terminals are connected to said memory section and are also connected to said data communication section.

10. The memory card according to claim 1, wherein said data communication section performs data communication by electromagnetic waves via an external antenna that is connected to the above data communication section via said two second connection pieces, and wherein said data communication section is powered by said electromagnetic waves.

11. The memory card according to claim 1, wherein said data communication section transmits/receives data to an external device by a differential form between data of a positive polarity on a first of said two second connection pieces and data of a negative polarity on a second of said two second connection pieces.

12. The memory card according to claim 11, wherein by forming a transmission line having characteristic impedance between both or one of the two second connection pieces connected to said data communication section and said ground terminal, impedance is matched between said transmission line and an external device for transmitting said data via the above transmission line.

13. The memory card according to claim 1, wherein two of said plural first connection pieces include a ground terminal for supplying ground potential to said memory section, said row has a first contiguous row portion and a second contiguous row portion in which only plural first connection pieces are arranged, said two second connection pieces are disposed between said first contiguous row portion and a second contiguous row portion, and wherein a first connection piece of said first contiguous row portion closest to said two second connection pieces is a ground terminal, and a first connection piece of said second contiguous row portion closest to said two second connection pieces is a ground terminal.

14. The memory card according to claim 1, wherein said row is provided at one end of the memory card, and said data communication section is provided at an opposite end of the memory card.

15. The memory card according to claim 1, wherein said ground terminal of said plural first connection pieces is not connected to said data communication section.

16. The memory card according to claim 1, wherein one of said plural first connection pieces includes a power supply terminal for supplying power to said memory section, and said power supply terminal is not connected to said data communication section.

17. The memory card according to claim 1, wherein said data communication section performs wireless data transmission and/or receiving.

18. A system for transmitting information comprising:
a memory card comprising:
    a thin-plate-shaped holding member made from insulating material;
    a memory section for performing data writing and/or reading provided in said holding member;
    plural first connection pieces provided on a surface of said holding member and electrically connected to said memory section, such that at least one of said plural first connection pieces is a ground terminal for supplying a ground potential to said memory section;
    a data communication section for performing data transmission and/or receiving separate from data being delivered to and/or from said memory section via said plurality of first connection pieces is provided in said holding member; and
    two second connection pieces electrically connected to said data communication section are provided on the surface of said holding member;
    wherein;
    said plural first connection pieces are arranged on the surface of said holding member in a row;
    said two second connection pieces are immediately adjacent to each other, and are arranged in said row together with said plural first connection pieces; and
    a closest first connection piece adjacent to said second connection pieces in said row is said ground terminal;
an external computing system including a wireless transmission circuit for transmitting and/or receiving wireless information; and
an external antenna including an interface for interfacing with said two second connection pieces of said memory card;
wherein said data communication section performs data communication with said external computing system by electromagnetic waves via said external antenna that is connected to the above data communication section via said two second connection pieces, and wherein said data communication section is powered by said electromagnetic waves provided by said external computing system.

19. A method of reducing interference between a memory circuit and a wireless data communication circuit both encased together in an insulating material, the method comprising the steps of:
providing a memory card comprising:
    a thin-plate-shaped holding member made from insulating material;
    a memory section for performing data writing and/or reading provided in said holding member;
    plural first connection pieces provided on a surface of said holding member and electrically connected to said memory section, such that at least one of said plural first connection pieces is a ground terminal for supplying a ground potential to said memory section;
    a data communication section for performing data transmission and/or receiving separate from data being delivered to and/or from said memory section via said plurality of first connection pieces is provided in said holding member; and
    two second connection pieces electrically connected to said data communication section are provided on the surface of said holding member;
arranging said plural first connection pieces are on the surface of said holding member in a row,
arranging said two second connection pieces immediately adjacent to each other and in said same row as said plural first connection pieces, and
arranging a ground terminal as the closest first connection piece adjacent to said second connection pieces in said row.

* * * * *